United States Patent
Lengauer et al.

(10) Patent No.: US 12,090,535 B2
(45) Date of Patent: *Sep. 17, 2024

(54) HEATING DEVICE FOR THE INDUCTIVE HEATING OF A FLAT STEEL STRIP IN A HOT ROLLING MILL

(71) Applicant: Primetals Technologies Austria GmbH, Linz (AT)

(72) Inventors: Thomas Lengauer, Weißkirchen a.d. Traun (AT); Bernd Linzer, Leombach (AT); Michael Zahedi, St. Marien (AT)

(73) Assignee: Primetals Technologies Austria GmbH, Linz (AT)

( * ) Notice: Subject to any disclaimer, the term of this patent is extended or adjusted under 35 U.S.C. 154(b) by 128 days.

This patent is subject to a terminal disclaimer.

(21) Appl. No.: 17/599,088

(22) PCT Filed: Mar. 4, 2020

(86) PCT No.: PCT/EP2020/055681
§ 371 (c)(1),
(2) Date: Sep. 28, 2021

(87) PCT Pub. No.: WO2020/200612
PCT Pub. Date: Oct. 8, 2020

(65) Prior Publication Data
US 2022/0193741 A1    Jun. 23, 2022

(30) Foreign Application Priority Data

Mar. 29, 2019  (AT) .............................. A 50273/2019
May 29, 2019   (EP) ..................................... 19177246

(51) Int. Cl.
*B21B 45/00*    (2006.01)
*B21B 1/02*     (2006.01)
(Continued)

(52) U.S. Cl.
CPC ............ *B21B 45/004* (2013.01); *B21B 1/026* (2013.01); *B21B 1/04* (2013.01); *C21D 1/42* (2013.01); *C21D 9/60* (2013.01)

(58) Field of Classification Search
CPC ......... B21B 45/004; B21B 1/026; B21B 1/04; B21B 37/44; B21B 37/74; C21D 1/42; C21D 9/60
See application file for complete search history.

(56) References Cited

U.S. PATENT DOCUMENTS 2,448,011 A * 8/1948 Baker ................... H05B 6/365
                                                      219/645
6,265,701 B1   7/2001 Bickel et al.
(Continued)

FOREIGN PATENT DOCUMENTS

AT        507663 A4    7/2010
CN      102387874 A    3/2012
(Continued)

OTHER PUBLICATIONS

International Search Report and Written Opinion received in International Application No. PCT/EP2020/055681 dated May 19, 2020, pp. 13.

(Continued)

*Primary Examiner* — Jessee R Roe
*Assistant Examiner* — Michael Aboagye
(74) *Attorney, Agent, or Firm* — Liang & Hennessey LLP; Brian Hennessey

(57) ABSTRACT

A heating device and a method for the inductive heating of a flat steel strip in a hot rolling mill. The heating device is between two rolling trains of the hot rolling mill and the flat steel strip runs at a speed through the heating device in a transporting direction. The heating device includes: transverse-field modules arranged one after the other along the (Continued)

transporting direction of the flat steel strip; longitudinal-field modules arranged one after the other along the transporting direction of the flat steel strip and arranged before or after the transverse-field modules along the transporting direction; a first power supply supplying at least one transverse-field module with a first alternating voltage; and a second power supply supplying at least one longitudinal-field module with a second alternating voltage. The power supplies have a converter and an electrically connected capacitor bank with multiple capacitors connected in parallel.

17 Claims, 8 Drawing Sheets

(51) Int. Cl.
  *B21B 1/04* (2006.01)
  *C21D 1/42* (2006.01)
  *C21D 9/60* (2006.01)

(56) References Cited

U.S. PATENT DOCUMENTS

| | | | |
|---|---|---|---|
| 8,102,682 | B2 | 1/2012 | Haimer et al. |
| 8,420,990 | B2 | 4/2013 | Mochinaga et al. |
| 8,950,227 | B2 | 2/2015 | Hohenbichler et al. |
| 9,855,598 | B2 | 1/2018 | Winter |
| 2011/0284527 | A1 | 11/2011 | Holverson et al. |
| 2012/0067095 | A1 | 3/2012 | Hohenbichler et al. |
| 2022/0193741 | A1* | 6/2022 | Lengauer ............ B21B 1/026 |

FOREIGN PATENT DOCUMENTS

| | | |
|---|---|---|
| CN | 103068502 A | 4/2013 |
| CN | 108413774 A | 8/2018 |
| DE | 2704451 A1 | 8/1977 |
| DE | 102006002505 A1 | 5/2007 |
| DE | 102013224547 A1 | 6/2015 |
| DE | 102016224822 A1 | 2/2018 |
| DE | 102017212529 A1 | 1/2019 |
| EP | 3025799 A1 | 6/2016 |
| EP | 3284546 A1 | 2/2018 |
| JP | H0866302 A | 3/1996 |
| RU | 2032996 C1 | 4/1995 |
| RU | 2039420 C1 | 7/1995 |
| RU | 2317657 C2 | 2/2008 |
| RU | 2406275 C2 | 12/2010 |
| RU | 2449510 C1 | 4/2012 |
| RU | 172183 U1 | 6/2017 |
| SU | 224719 A1 | 12/1968 |
| SU | 847528 A1 | 7/1981 |
| SU | 1031006 A1 | 7/1983 |
| WO | 2011038965 A1 | 4/2011 |

OTHER PUBLICATIONS

Anis Abdurahman et al: "Einsatz flexibler Induktionseinheiten zur Produktions—und Qualitätserhöhung in Warmwalzwerken", E Lektrowarme International, Feb. 1, 2012 (Feb. 1, 2012), pp. 47-51, XP055467400; 2012.
European Search Report received in European Application No. 19177246.6 dated Jan. 22, 2020, pp. 6.
Office Action received in Russian Application No. 2021118671/05(039330) dated Jan. 17, 2022, pp. 19.
Office Action and Search Report received in Chinese Application No. 202080026191.2 dated Jan. 13, 2023, pp. 13.

* cited by examiner

HEATING DEVICE FOR THE INDUCTIVE HEATING OF A FLAT STEEL STRIP IN A HOT ROLLING MILL

CROSS-REFERENCE TO RELATED APPLICATIONS

The present application is a national phase application of PCT Application No. PCT/EP2020/055681, filed Mar. 4, 2020, entitled "HEATING DEVICE FOR THE INDUCTIVE HEATING OF A FLAT STEEL STRIP IN A HOT ROLLING MILL", which claims the benefit of European Patent Application No. 19177246.6, filed May 29, 2019, and the benefit of Austrian Patent Application No. A50273/2019, filed Mar. 29, 2019, each of which is incorporated by reference in its entirety.

BACKGROUND OF THE INVENTION

1. Field of the Invention

The invention relates to a heating device and to a method for the inductive heating of a flat steel strip in a hot rolling mill by means of the heating device, wherein the heating device is arranged between two rolling trains of the hot rolling mill and the flat steel strip runs at a speed through the heating device in a transporting direction. The heating device could also be arranged before a rolling train (for example the roughing train) or between two stands of a rolling train (for example the finishing train).

2. Description of the Related Art

In a hot rolling mill, a flat steel strip (steel strip or preliminary strip for short) is typically transported on a roller table from a first rolling train (also roughing train or roughing mill) to a second rolling train (also finishing train or finishing mill). In this case, the flat steel strip is moved at a speed in a transporting direction which corresponds to the longitudinal direction of the flat steel strip. Due to the contact of the hot flat steel strip with air, scale forms on the flat steel strip. In order to prevent scale from being rolled in, the flat steel strip is descaled before the rough rolling and/or before the finish rolling, whereby the temperature is lowered. In order to compensate for the heat losses of the flat steel strip due to the descaling and the transport between the two rolling trains and to allow the final rolling of the flat steel strip in the last stand of the finishing train in a specific temperature range (for example in the austenitic range), the flat steel strip is heated by a heating device, in particular an inductive heating device, which is arranged between the two rolling trains.

During the heating up of the flat steel strip in the hot rolling mill by means of the inductive heating device, attention must be paid to the operating point of the heating device. This means in the case of inductive heating devices according to the prior art that the heating device is either adapted for the heating of thin steel strips, for example with a thickness of between 6 mm and 15 mm, or the heating device is adapted for the heating of thick steel strips, for example with a thickness of greater than 15 mm. By adapting the respective operating points to the prevailing operating conditions, the heating device can meet the requirements for the efficiency and the required temperature profile in the respective thickness range, i.e. the temperature distribution over the width and preferably the thickness of the steel strip. This has the consequence that in the first case thick steel strips, for example with a thickness of >18 mm, cannot be heated appropriately and in the second case thin steel strips, for example with a thickness of <12 mm, cannot be heated appropriately. Cannot be heated "appropriately" means that the efficiency and/or the temperature profile of the heating device is poor or unacceptable.

SUMMARY OF THE INVENTION

The cause of this problem is that different thickness ranges of steel strips require different heating concepts, for example that the heating device generates in the steel strip a magnetic field with a specific working frequency transversely or longitudinally in relation to the transporting direction of the steel strip and the magnetic field is matched to a specific thickness range.

Since the heating concept and the working frequency (i.e. the frequency of the alternating voltage with which the heating device is operated or works) of an inductive heating device are largely dictated by its structure, in the case of heating devices according to the prior art there is either no flexibility for covering a great thickness range or it is only possible very limitedly. Moreover, the working frequency of an induction heating according to the prior art cannot be changed. Changes of the working frequency are only possible after a lengthy conversion of the heating device.

In order to be able to produce many different end products in a hot rolling mill such as a combined casting-rolling plant, in particular an Arvedi ESP plant, a CSP plant or a QSP-DUE plant, it is desirable to be able to heat up steel strips energy-efficiently and homogeneously with regard to the temperature profile over a great thickness range.

The invention is based on the object of providing an improved heating device and an improved method for the inductive heating of a flat steel strip which moves at a speed in a transporting direction between two rolling trains of a hot rolling mill, in particular a combined casting-rolling plant. In particular, the temperature profile of the steel strip is intended to be more homogeneous than in the case of known heating devices in the direction of the width, for example from 900 to 2100 mm, and in the direction of the thickness, for example from 6 to 65 mm.

A heating device according to the invention for the inductive heating of a flat steel strip in a hot rolling mill, wherein the heating device is arranged between two rolling trains of the hot rolling mill and the flat steel strip runs at a speed through the heating device in a transporting direction, comprises:

a plurality, in particular 6 to 12, particularly preferably 8 to 10, of transverse-field modules, which are arranged one after the other along the transporting direction of the flat steel strip, a plurality, in particular 2 to 8, of longitudinal-field modules, which are arranged one after the other along the transporting direction of the flat steel strip and are arranged before and/or after the transverse-field modules along the transporting direction, and a first power supply, for supplying at least one transverse-field module with a first alternating voltage, and a second power supply, for supplying at least one longitudinal-field module with a second alternating voltage, wherein the first and the second power supply have in each case a converter and an electrically connected capacitor bank with multiple capacitors connected in parallel.

A transverse-field module comprises at least one coil, preferably a coil above the steel strip and a coil below the steel strip, wherein the coil or the coils can generate a magnetic field transversely to the transporting direction, specifically in the thickness direction, and consequently perpendicularly to the upper side and the underside of the flat steel strip, and can in this way inductively heat the steel strip. A transverse-field module is suitable in particular for heating thin steel strip.

A longitudinal-field module comprises one or more coils, which can generate a magnetic field in the longitudinal direction, specifically in the transporting direction, and consequently parallel to the upper side and the underside of the flat steel strip, and can in this way inductively heat the steel strip. A longitudinal-field module is suitable in particular for heating thick steel strip.

The combination of in each case multiple transverse-field modules and longitudinal-field modules allows both thin and thick steel strips to be inductively heated with high efficiency and a homogeneous temperature profile in the direction of the width of the steel strip.

According to the invention, the heating device comprises a first power supply, for supplying at least one transverse-field module with a first alternating voltage, and a second power supply, for supplying at least one longitudinal-field module with a second alternating voltage, wherein the power supplies have in each case a converter and an electrically connected capacitor bank with multiple capacitors connected in parallel.

Since the first alternating voltage is generally different from the second alternating voltage with regard to the frequency, the voltage amplitude, the current intensity and the power, it is provided according to the invention that the first power supply supplies at least one transverse-field module with a first alternating voltage and the second power supply supplies at least one longitudinal-field module with a second alternating voltage. The first alternating voltage and the second alternating voltage are in each case optimized for the optimized operation of the at least one transverse-field module and longitudinal-field module.

The inductances of the coil or the coils of one or more transverse-field modules form a first circuit with the capacitances of the capacitor bank of the first power supply. In a way analogous to this, the inductances of the coil or the coils of one or more longitudinal-field modules form a second circuit with the capacitances of the capacitor bank of the second power supply.

Preferably, the first and/or the second power supply or the converter of the respective power supply comprises a frequency input for determining a setpoint frequency, wherein the frequency of the respectively generated alternating voltage follows the setpoint frequency. In particular, the frequency can be changed during a heating operation.

In a first case, the power supply or the converter is a non-load-commutated or externally commutated converter or a non-load-commutated power supply. This specifically means that the operating frequency of the alternating voltage is not a result of the inductances and capacitances present in the circuit, but instead the operating frequency can be determined separately, for example by a frequency input.

In a second case, the power supply or the converter is a load-commutated converter or a load-commutated power supply, wherein the operating frequency of the alternating voltage can be changed by changing the capacitor bank, for example by activating or deactivating capacitors, and/or by changing the longitudinal- or transverse-field modules, for example by activating or deactivating coils. The load-commutated converter always generates an alternating voltage in dependence on the inductances and capacitances present in the circuit (also known as an LC resonant circuit). Separately specifying the operating frequency of the alternating voltage is not possible.

There are accordingly two possibilities for changing the operating frequency of the alternating voltage:

1) The converter is a load-commutated converter or is operated as a load-commutated converter. In this case, the converter generates an alternating voltage of which the frequency is obtained from the inductances and capacitances present in the LC resonant circuit. This allows the operating frequency of the alternating voltage to be changed by changing the inductance of the coil or the coils present in the circuit and/or the capacitance of the capacitor banks present in the circuit. According to a simple embodiment, capacitors of the capacitor bank or coils may be activated or deactivated. The activation or deactivation has the effect that the changing of the operating frequency is performed in the form of stages.

2) The converter is a non-load-commutated converter or is operated as a non-load-commutated converter. In this case, the converter generates an alternating voltage independently of the inductances and capacitances present in the LC resonant circuit. The operating frequency of the alternating voltage is in this case directly determined by the converter. Changing the inductance of the coil or the coils and/or the capacitance of the capacitor banks is generally not necessary. The changing of the operating frequency may be performed continuously or in the form of stages.

The frequency input may be for example an analog or digital input or else just a simple switch for changing the capacitance of the capacitor bank.

For example, the frequency may be set in dependence on the thickness of the flat steel strip or other parameters; the setting may be performed in particular in a closed-loop or open-loop controlled manner. The thickness of the flat steel strip may either be measured or adopted from a past sequence of the upstream rolling train. The heating throughout the steel strip can be specifically influenced on the basis of the frequency, higher frequencies tending to heat only the regions near the surface and lower frequencies tending to bring about a relatively uniform heating of all the regions across the thickness.

Transverse-field modules are operated according to the invention with an alternating voltage with a frequency of between 200 and 1500 Hz. Longitudinal-field modules are also operated with an alternating voltage, though of between 3000 and 8000 Hz, in the case of particularly thin strips even up to 40 kHz.

In one embodiment, the frequency of the alternating voltage can be changed, for example can be switched over, during the operation of the heating device or during a heating operation. As an alternative to this, the frequency may be switched over without any conversion during a downtime of the plant, i.e. before or after a heating operation.

The frequency input is typically connected to a plant controller of the hot rolling mill or to an open-loop or closed-loop control device.

It is advantageous if the first and/or the second power supply of at least one transverse-field module or one longitudinal-field module comprises a current input for determining a setpoint current intensity and the current intensity of the generated alternating voltage follows the setpoint current intensity. The current intensity may be either the current intensity of the current generated by the converter or the current intensity that flows through the coil or the coils of the transverse-field or longitudinal-field module. The current input is typically an analog input (for example a so-called 4 to 20 mA input) or a digital input. The changing of the current intensity is usually performed continuously or quasi-continuously, for example following a 6-(64 stages), 8-(256 stages) or 10-bit signal, by a current adjusting element, for example a controller.

It is advantageous if the first and/or the second power supply, in particular the converter, of at least one transverse-field module or one longitudinal-field module comprises a voltage input for determining a setpoint voltage amplitude, the voltage amplitude of the generated alternating voltage following the setpoint voltage amplitude. The voltage input may in turn be an analog input (for example a so-called 4 to 20 mA input) or a digital input.

It is also advantageous if the first and/or the second power supply, in particular the converter, of at least one transverse-field module or one longitudinal-field module comprises a power input for determining a setpoint power, the heating power of the generated alternating voltage following the setpoint power. The power input may in turn be an analog input (for example a so-called 4 to 20 mA input) or a digital input.

It is advantageous if the heating device comprises a thrust actuator for changing the width position of at least one coil of a transverse-field module in the direction of the width of the flat steel strip. It is particularly preferred if a first thrust actuator can move at least one coil on the upper side of the steel strip and a second thrust actuator can move at least one coil on the underside of the steel strip. As a result, the transverse-field module can uniformly heat different widths of steel strips and excessive heating of the edge regions is avoided.

It is preferred if at least one transverse-field module comprises a width input for determining a setpoint width position and the width position of a coil of the transverse-field module in the direction of the width follows the setpoint width position. The conversion of the setpoint width position into the width position is performed for example by a position controller.

It is advantageous if the heating device has at least one lift actuator for changing the height position of at least one coil of a transverse-field module in the direction of the height. It is particularly preferred if a first lift actuator can raise or lower at least one coil on the upper side of the steel strip and a second lift actuator can raise or lower at least one coil on the underside of the steel strip in relation to the flat steel strip. As a result, the so-called coupling gap between the coil or the coils and the flat steel strips can be kept constant even when there are different thicknesses, whereby the efficiency of the heating device is increased. Furthermore, the coil or the coils can be removed from the steel strip in the event of a fault in the hot rolling mill, making it easier for it to be serviced.

It is preferred if at least one transverse-field module comprises a height input for determining a setpoint height position and the height position of a coil of the transverse-field module in the direction of the thickness follows the setpoint height position. The conversion of the setpoint height position to the height position is performed for example by a position controller.

The thrust or lift actuators may be for example hydraulic, pneumatic or electromechanical actuators.

A width or height input may in turn be an analog input (for example 4-20 mA) or a digital input.

The heating device preferably comprises an open-loop or closed-loop control device, wherein the open-loop or closed-loop control device comprises at least one output, preferably multiple outputs, from the group comprising
 a frequency output for determining a setpoint frequency of the first alternating voltage,
 a current output for determining a setpoint current intensity of the first alternating voltage,
 a voltage output for determining a setpoint voltage of the first alternating voltage,
 a power output for determining a setpoint power of the first alternating voltage,
 and the open-loop or closed-loop control device additionally comprises
 a width output for determining a setpoint width position in the direction of the width of a coil of a transverse-field module and/or
 a height output for determining a setpoint height position in the direction of the thickness of a coil of a transverse-field module,
 wherein at least one output from the group comprising the setpoint current intensity, the setpoint frequency, the setpoint voltage and the setpoint power and additionally the setpoint width position and/or the setpoint height position are set in dependence on at least one parameter of the flat steel strip from the group comprising the thickness, the width, the speed, the temperature before entering the heating device, and the temperature after leaving the heating device.

The aforementioned open-loop or closed-loop control device is optimized for the operation of transverse-field modules.

The heating device preferably comprises an open-loop or closed-loop control device, wherein the open-loop or closed-loop control device comprises at least one output from the group comprising
 a frequency output for determining a setpoint frequency of the second alternating voltage,
 a current output for determining a setpoint current intensity of the second alternating voltage,
 a voltage output for determining a setpoint voltage of the second alternating voltage,
 a power output for determining a setpoint power of the second alternating voltage,
 wherein at least one output from the group comprising the setpoint current intensity, the setpoint frequency, the setpoint voltage and the setpoint power is set in dependence on at least one parameter of the flat steel strip from the group comprising the thickness, the width, the speed, the temperature before entering the heating device, and the temperature after leaving the heating device.

The last-mentioned open-loop or closed-loop control device is optimized for the operation of longitudinal-field modules.

It is of course possible that the open-loop or closed-loop control device consists of multiple modules or units, for example a first unit for determining the setpoint frequency and/or the setpoint current intensity and a second unit for determining the width position and/or the height position of at least one coil. In this case, both units are set in dependence on at least one parameter of the flat steel strip from the group comprising the thickness, the width, the speed, the temperature before entering the heating device, and the temperature after leaving the heating device. An open-loop or closed-loop control device may activate one or more transverse-field modules. It is also possible that an open-loop or closed-loop control device set the current intensity and possibly the current intensities of one or more longitudinal-field modules in dependence on at least one of the aforementioned parameters.

The open-loop or closed-loop control devices allow the heating device to heat steel strips of different thicknesses, widths, speeds and with different temperatures optimally with respect to the efficiency and the temperature profile.

According to exemplary embodiments, a flat steel strip is inductively heated by means of the heating device according to the invention, wherein the heating device is arranged between two rolling trains of a hot rolling mill and the flat steel strip runs at a speed through the heating device in a transporting direction. In this case, the flat steel strip is heated by a plurality of transverse-field modules arranged one after the other along the transporting direction and by a plurality of longitudinal-field modules arranged one after the other along the transporting direction of the flat steel strip, wherein the longitudinal-field modules are arranged before and/or after the transverse-field modules in the transporting direction. According to the invention, a power supply for supplying at least one transverse-field module or at least one longitudinal-field module has a converter, which is operated as a load-commutated converter, wherein the frequency f of the generated alternating voltage is, where $LG_{es}$ indicates the total inductive load and $CG_{es}$ indicates the total capacitive load in the circuit.

As an alternative to this, a flat steel strip according to exemplary embodiments is inductively heated by means of the heating device according to the invention, wherein the heating device is arranged between two rolling trains of a hot rolling mill and the flat steel strip runs at a speed through the heating device in a transporting direction. In this case, the flat steel strip is heated by a plurality of transverse-field modules arranged one after the other along the transporting direction and by a plurality of longitudinal-field modules arranged one after the other along the transporting direction of the flat steel strip, wherein the longitudinal-field modules are arranged before and/or after the transverse-field modules in the transporting direction. According to the invention, a power supply for supplying at least one transverse-field module or at least one longitudinal-field module has a converter, which is operated as an externally commutated (i.e. non-load-commutated) converter, wherein the frequency f of the generated alternating voltage is, where $LG_{es}$ indicates the total inductive load and $CG_{es}$ indicates the total capacitive load in the circuit.

According to an advantageous embodiment, while it is being threaded in and out of the heating device, the flat steel strip is heated in a voltage-controlled manner, so that the voltage follows the setpoint voltage, and during the quasi-continuous operation of the heating device it is heated in a power-controlled manner, so that the heating power follows the setpoint power.

In one embodiment, at least one transverse-field module is operated with an alternating voltage with a frequency, wherein the frequency is changed during a rolling campaign or between two rolling campaigns. The frequency is preferably set in dependence on the thickness of the flat steel strip. Of course, further parameters may also be used for setting the frequency.

In one embodiment, the frequency is changed over or is variably changed during the operation of the heating device, i.e. during a rolling campaign. Alternatively, the frequency may also be changed before or after a heating operation, i.e. between two rolling campaigns.

According to one embodiment, at least one transverse-field module or at least one longitudinal-field module is operated with an alternating voltage with a current intensity and the current intensity is set in dependence on at least one parameter of the flat steel strip from the group comprising the thickness, the speed, the temperature before entering the heating device, and the temperature after leaving the heating device.

According to a further embodiment with a thrust actuator for moving at least one coil of a transverse-field module in the direction of the width, the width position of the coil is set in dependence on the width and/or a temperature profile of the flat steel strip. The temperature profile of the flat steel strip can be measured by a temperature measurement in multiple positions in the direction of the width of the steel strip either before entering the heating device or before entering a downstream rolling train. In particular, the temperature profile may for example be measured before descaling or preferably also after descaling.

According to a further embodiment with a lift actuator for moving at least one coil of a transverse-field module in the direction of the thickness, the height position sH of the coil is set in dependence on the thickness of the flat steel strip. As a result, the so-called coupling gap between the workpiece and the coil can be set and for example kept constant when there are different thicknesses of the workpiece.

The embodiments described combine different inductive heating concepts, for example transverse-field modules and longitudinal-field modules with different, in particular switchable or variably settable, working frequencies, so that a wide thickness range of the flat steel strips to be heated can be covered. The power distribution along the heating device and the working frequencies of the individual transverse-field modules and longitudinal-field modules can be chosen by setting the current intensity appropriately for the actual thickness of the flat steel strip. This means for example that, for certain thicknesses, heating is performed only or mostly with longitudinal-field modules and, for certain frequencies, it is supported only by transverse-field modules. The opposite situation may be the case for other thicknesses of the flat steel strips.

Various frequencies or sets of frequencies may be available for choice. The switching or variable changing of the frequencies may take place either online or off-line to optimize the heating efficiency and the temperature profile. The power distribution along the heating device may likewise be chosen to optimize the heating efficiency and the temperature profile. Different power distributions and different working frequencies along the heating device can be chosen in order to influence the material properties of an end product obtained from the flat steel strip to be heated.

The combination of different heating concepts with switchable or variably changeable working frequencies allows the product range of a rolling plant to be extended considerably. Use of different switching patterns (more or less power at transverse-field modules and longitudinal-field modules) at a specific working frequency allows the heating efficiency to be improved significantly and the temperature distribution over the thickness of the flat steel strip to be influenced. In this case, an energy saving of up to 50% is possible.

The width of the flat steel strip may be for example from 900 mm to 2100 mm, the thickness may be for example from 6 mm to 65 mm, in particular from 8 mm to 45 mm. The mass flow through the heating device may be for example from 200 t/h to 500 t/h. The heating device described can be adapted to changes of the thickness of the flat steel strip and of the mass flow. Optimized heating up of the start and the end of the flat steel strip provides high productivity in continuous operation, but also in batch mode or semi-continuous operation. By means of the device or the method described, homogeneous heating of the flat steel strip in the direction of the width and thickness can be achieved. A particularly small length of the heating device with a high power density and reduced heat losses can be achieved, even with low mass flow.

The reduced number of inductive modules and the low mechanical complexity allow costs to be reduced.

The arrangement according to the invention of transverse-field modules and longitudinal-field modules respectively in groups instead of in alternation allows easier closed-loop control of the overall heating device.

Each type of inductive modules or groups of modules, for example transverse-field modules, longitudinal-field modules or modules with different frequencies, has a typical heating behavior, so that in each case different temperature profiles are produced. It is easier for the control if a first group of modules produces a specific temperature profile, for example by means of longitudinal-field modules, which raise the temperature uniformly along the width of the flat steel strip, and the temperature profile produced is subsequently changed and optimized according to requirements with the aid of a second group of modules, for example by the transverse-field modules. Alternatively, other sequences may also be used. For example, the temperature profile may first be pre-set by transverse-field modules and then homogenization of the temperature achieved by longitudinal-field modules.

Transverse-field inductors can usually be operated with lower frequencies, since the heat can be introduced better into the material as a result of the specific formation of the magnetic fields. Usual working ranges in this case lie at approximately 200 Hz to 1500 Hz.

If only transverse-field modules are used, the efficiency increases sharply as strips become thinner (about 60% at 18 mm to about 80% at 8 mm). With thinnest strips, there is an almost homogeneous temperature distribution along the width of the strip, with small temperature deviations at the edges. With increasing strip thickness, the temperature deviations at the edges also increase and, as from about 14 mm to 15 mm, assume higher values. As from about 20 mm to 25 mm, that leads to edge overheating, which can have an adverse effect on product quality. Heating through of the strip reaches right into the core, since low operating frequencies can be used. On account of the low operating frequencies, a simpler construction of the voltage supply is possible.

In the case of longitudinal-field inductors, the heat input and the efficiency decrease drastically as strips become thinner. This is remedied by increasing the frequency. If, for example, a frequency range of 3000 Hz to 8000 Hz is sufficient for thicknesses greater than 15 mm, frequencies of 10 kHz to 15 kHz are advantageous for thin strip thicknesses to about 10 mm to allow efficient operation.

If the thickness of the strip falls further, the frequencies can even reach values up to 40 kHz.

If only longitudinal-field modules are used, the efficiency falls as strips become thinner (about 70% at 18 mm to about 40% at 8 mm). Therefore, a larger furnace and higher investment costs would be required for the same production quantity. With all strip thicknesses there is always an almost homogeneous temperature distribution. As a result, the temperature run-in profile is "only" uniformly raised. Consequently, even after heating, cold edges in the run-in remain colder.

If a greater thickness range is to be covered, a combination of induction modules, each adjusted and designed for a fixed working frequency, may also be used.

Alternatively, induction modules that can be switched over to the required optimum working frequency or varied according to the current production parameters may also be used in this case.

By a combination of grouped longitudinal-field modules and transverse-field modules for all types of endless strip production plants (ESP), the present invention allows an optimized heating device to be configured, with high efficiency and optimized temperature distribution.

The following types of heating devices for ESP production plants should be mentioned here by way of example:

Intermediate strip thickness of between 6 mm and 17 min: about 80 to 90% of the intermediate strip produced has a thickness of between 6 and 12 mm, the rest of production a thickness of between 12 mm and 17 mm. The heating device may in this case comprise for example 8 to 10 transverse-field modules. Optionally, two longitudinal-field modules may also be used to optimize the temperature profile.

Intermediate strip thickness of between 6 mm and 20 min: the entire thickness range is used in production. The heating device may in this case comprise for example 8 to 10 transverse-field modules and two to four longitudinal-field modules. This provides good efficiency of the transverse-field modules for thin strips and a homogeneous temperature profile as a result of uniform heating by the longitudinal-field modules.

Intermediate strip thickness of 6 mm or 8 mm to 45 mm or 50 mm: the heating device may in this case comprise for example 8 to 10 transverse-field modules and 6 to 8 longitudinal-field modules. In the case of a thick intermediate strip, the energy is for the most part introduced by the longitudinal-field modules. This is advantageous for thick strips. The transverse-field modules mainly serve the purpose of heating the corner regions and the core of the intermediate strip, and thereby homogenizing the temperature profile in the direction of the width and the direction of the thickness of the intermediate strip. In the case of a thin intermediate strip, the energy is for the most part introduced by the transverse-field modules. This is advantageous for thin strips. The longitudinal-field modules are either switched off or only introduce little energy into the intermediate strip.

An intermediate strip is a flat steel strip that has been rolled in a first rolling train (roughing train) of the hot rolling mill but has not yet been finish-rolled in a second rolling train (finishing train).

BRIEF DESCRIPTION OF THE DRAWINGS

The properties, features and advantages of this invention described above and also the manner in which they are achieved become clearer and more clearly understandable in connection with the following description of exemplary embodiments, which are explained more specifically in conjunction with the drawings, in which.

Parts that correspond to one another are provided with the same designations in all of the figures.

DETAILED DESCRIPTION

Figure 1:
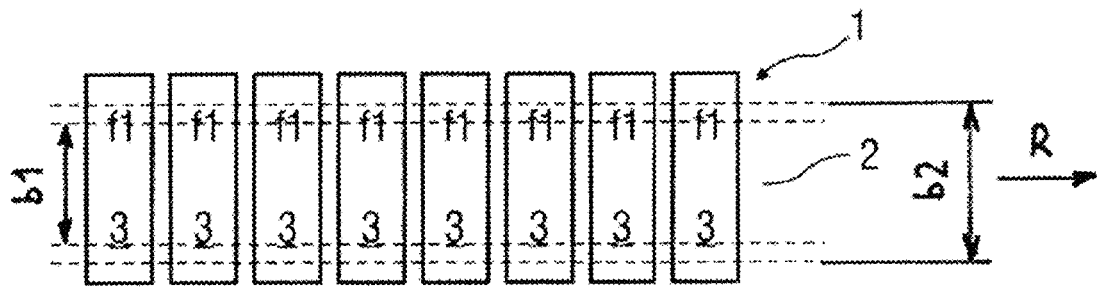
FIG. 1 shows a schematic plan view of a first embodiment, not according to the invention, of a heating device for heating a flat steel strip.

FIG. 1 shows a schematic view of a first embodiment, not according to the invention, of a heating device 1 for the inductive heating of a flat steel strip 2. The flat steel strip leaves a roughing train, which is not shown, is heated by means of the heating device 1 and, after the heating, enters a finishing train, which is not shown. Optionally, before entering the finishing train, the heated flat steel strip 2 may also be descaled. The heating device 1 comprises eight transverse-field modules 3. A transverse-field module 3 comprises an inductor above and an inductor below the flat steel strip 2, which generate a magnetic field transversely to the transporting direction R, specifically in the direction of the thickness, and consequently perpendicularly to the upper side and underside of the flat steel strip 2, and inductively heat it in this way. In the embodiment shown, eight transverse-field modules 3 are provided, arranged one after the other. However, a greater or smaller number of transverse-field modules 3 may also be provided. The transverse-field modules 3 are operated with alternating voltage of a first frequency f1. The heating device 1 is suitable for example for heating flat steel strips with thicknesses of 6 mm to 17 mm. The flat steel strip 2 can assume different widths b1, b2. In order to prevent overheating of the edge regions of the flat steel strip 2, the inductors of the transverse-field modules 3 can be moved in relation to an edge, for example the upper inductor, arranged above the strip, may be moved in relation to the edge shown at the top and the lower inductor, arranged below the strip, may be moved in relation to the edge shown at the bottom, in each case by means of an actuator.

Figure 2:
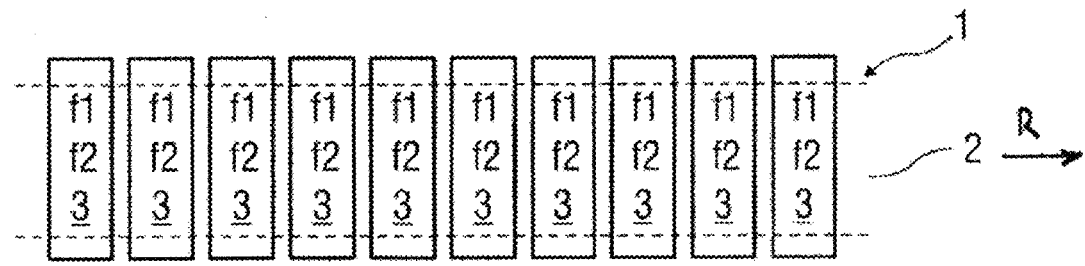
FIG. 2 shows a schematic plan view of a second embodiment, not according to the invention, of a heating device for heating a flat steel strip.

FIG. 2 shows a schematic view of a second embodiment, not according to the invention, of a heating device 1 for the inductive heating of a flat steel strip 2, in particular for heating between two rolling trains of a hot rolling mill. The heating device 1 comprises ten transverse-field modules 3. A transverse-field module 3 once again comprises an inductor above and an inductor below the flat steel strip 2, which generate a magnetic field transversely to the transporting direction R, specifically in the direction of the thickness, and inductively heat it in this way. In the embodiment shown, ten transverse-field modules 3 are provided, arranged one after the other. However, a greater or smaller number of transverse-field modules 3 may also be provided. The transverse-field modules 3 are operated with alternating voltage with a switchable frequency, wherein the frequency can assume the value f1 or the value f2, where f2 is greater than f1. The heating device 1 is suitable for example for heating flat steel strips with thicknesses of 6 mm to 15 mm, but with an additional possibility for setting the temperature profile.

Figure 3:
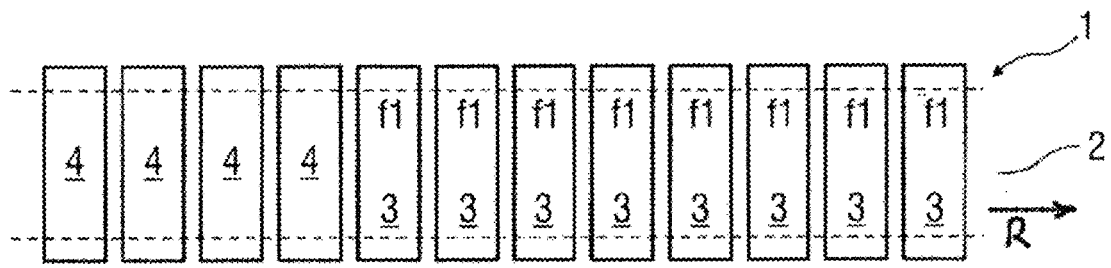
FIG. 3 shows a schematic plan view of a first embodiment according to the invention of a heating device for heating a flat steel strip.

FIG. 3 shows a schematic view of a first embodiment according to the invention of a heating device 1 for the inductive heating of a flat steel strip 2, in particular between two rolling trains of a hot rolling mill. The heating device 1 comprises a number of transverse-field modules 3 and longitudinal-field modules 4, which are arranged one after the other. A transverse-field module 3 comprises one or more inductors, which generate a magnetic field transversely to the transporting direction R, specifically in the direction of the thickness of the flat steel strip 2, and inductively heat it in this way. In the embodiment shown, eight transverse-field modules 3 are provided, arranged one after the other. However, a greater or smaller number of transverse-field modules 3 may also be provided. A longitudinal-field module 4 comprises one or more inductors, which generate a magnetic field in the longitudinal direction, specifically in the transporting direction R, and consequently parallel to the upper side and underside of the flat steel strip 2, and inductively heat it in this way. In the embodiment shown, four longitudinal-field modules 4 are provided, arranged one after the other. However, a greater or smaller number of longitudinal-field modules 4 may also be provided. The transverse-field modules 3 are operated with alternating voltage of a first frequency f1. The heating device 1 is suitable for example for heating flat steel strips with thicknesses of 6 mm to 20 mm.

Figure 4:
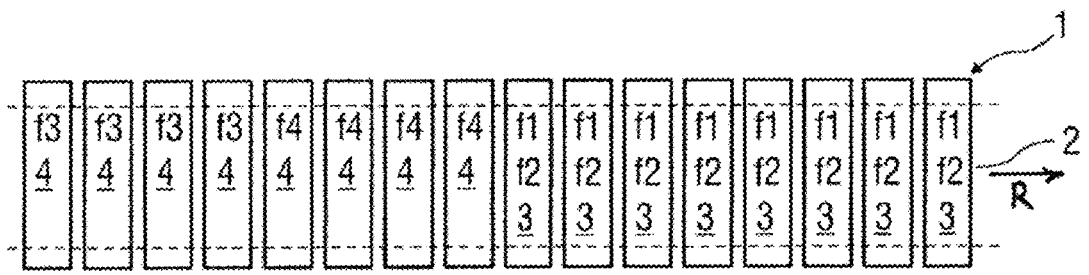
FIG. 4 shows a schematic plan view of a second embodiment according to the invention of a heating device for heating a flat steel strip.

FIG. 4 shows a schematic view of a second embodiment according to the invention of a heating device 1 for the inductive heating of a flat steel strip 2, in particular for heating between two rolling trains of a hot rolling mill. The heating device 1 comprises a number of transverse-field modules 3 and longitudinal-field modules 4, which are arranged one after the other. A transverse-field module 3 comprises one or more inductors, which generate a magnetic field transversely to the transporting direction R, specifically in the direction of the thickness of the flat steel strip 2, and inductively heat it in this way. In the embodiment shown, eight transverse-field modules 3 are provided, arranged one after the other. However, a greater or smaller number of transverse-field modules 3 may also be provided. A longitudinal-field module 4 comprises one or more inductors, which generate a magnetic field in the longitudinal direction, specifically in the transporting direction R, and consequently parallel to the upper side and underside of the flat steel strip 2, and inductively heat it in this way. In the embodiment shown, eight longitudinal-field modules 4 are provided, arranged one after the other. However, a greater or smaller number of longitudinal-field modules 4 may also be provided. The transverse-field modules 3 are operated with alternating voltage with a switchable frequency, wherein the frequency can assume the value f1 or the value f2, where f2 is greater than f1. The longitudinal-field modules 4 are operated either with a frequency f3 or f4, where f3>f2 and f4>f2. The heating device 1 is suitable for example for heating flat steel strips with thicknesses of 6 mm to 65 mm.

Figure 5A:
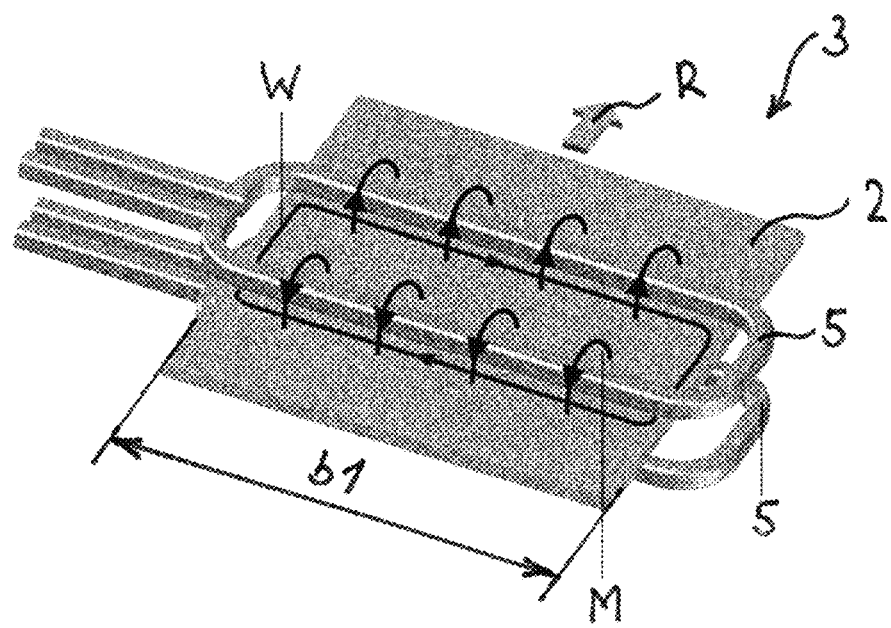
FIG. 5a shows a schematic representation of a transverse-field module for heating a flat steel strip.

FIG. 5a schematically shows a transverse-field module 3 with two coils 5, which are arranged above and below the flat steel strip 2. By feeding current to the coils 5 of the transverse-field module 3, a magnetic field M forms transversely to the transporting direction R in the direction of the thickness of the strip 2. As a result, the flat steel strip 2 with the thickness d and the width b1 is heated. Eddy currents W form on the upper side and the underside of the strip 2.

Figure 5B:
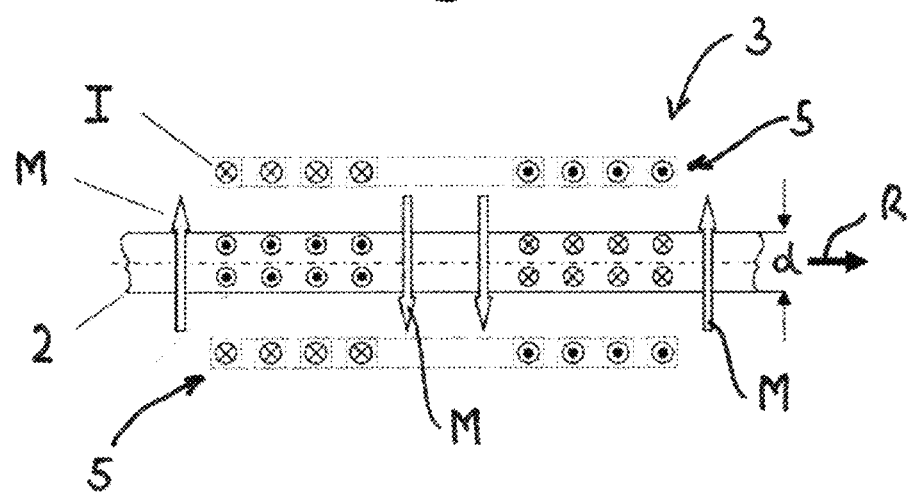
FIG. 5b shows a schematic representation of the current feed and the magnetic field of a transverse-field module for heating a flat steel strip.

In FIG. 5b, the current feed I (currents running into the plane of the drawing are shown by a cross, currents running out of the plane of the drawing are shown by a dot) of the coils 5 and the magnetic flux lines of the magnetic field M for a further transverse-field module 3 are shown.

Figure 6A:
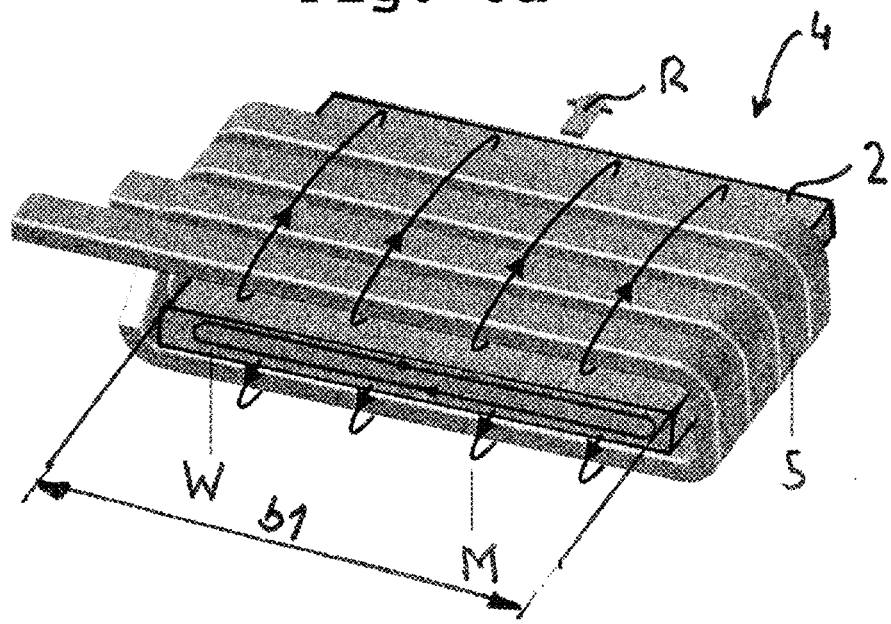
FIG. 6a shows a schematic representation of a longitudinal-field module for heating a flat steel strip.

FIG. 6a schematically shows a longitudinal-field module 4 with a coil 5, which encloses the flat steel strip 2 transversely to the transporting direction R. By feeding current to the coil 5 of the longitudinal-field module 4, a magnetic field M forms in the transporting direction R parallel to the upper side and the underside of the strip 2. As a result, the flat steel strip 2 with the thickness d and the width b1 is heated. Eddy currents W form parallel to the upper side and the underside of the strip 2.

Figure 6B:
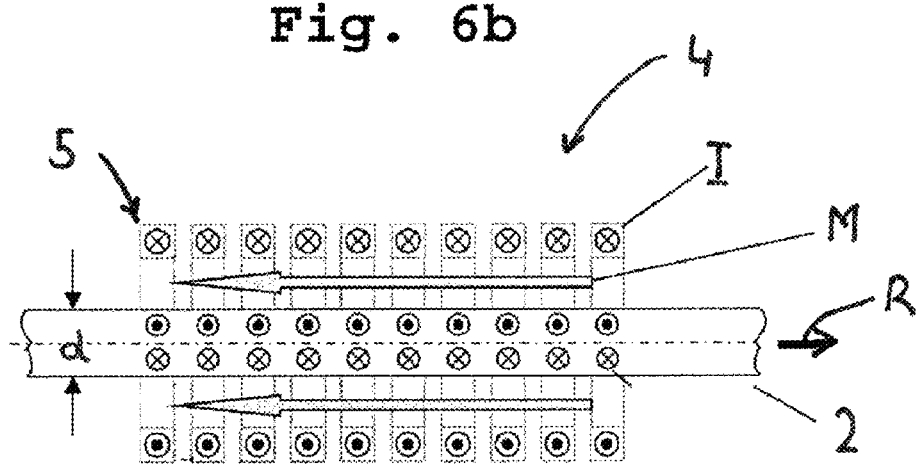
FIG. 6b shows a schematic representation of the current feed and the magnetic field of a longitudinal-field module for heating a flat steel strip.

In FIG. 6b, the current feed I (currents running into the plane of the drawing are shown by a cross, currents running out of the plane of the drawing are shown by a dot) of the coil 5 and the magnetic flux lines of the magnetic field M for a longitudinal-field module 4 are shown.

Figure 7A:
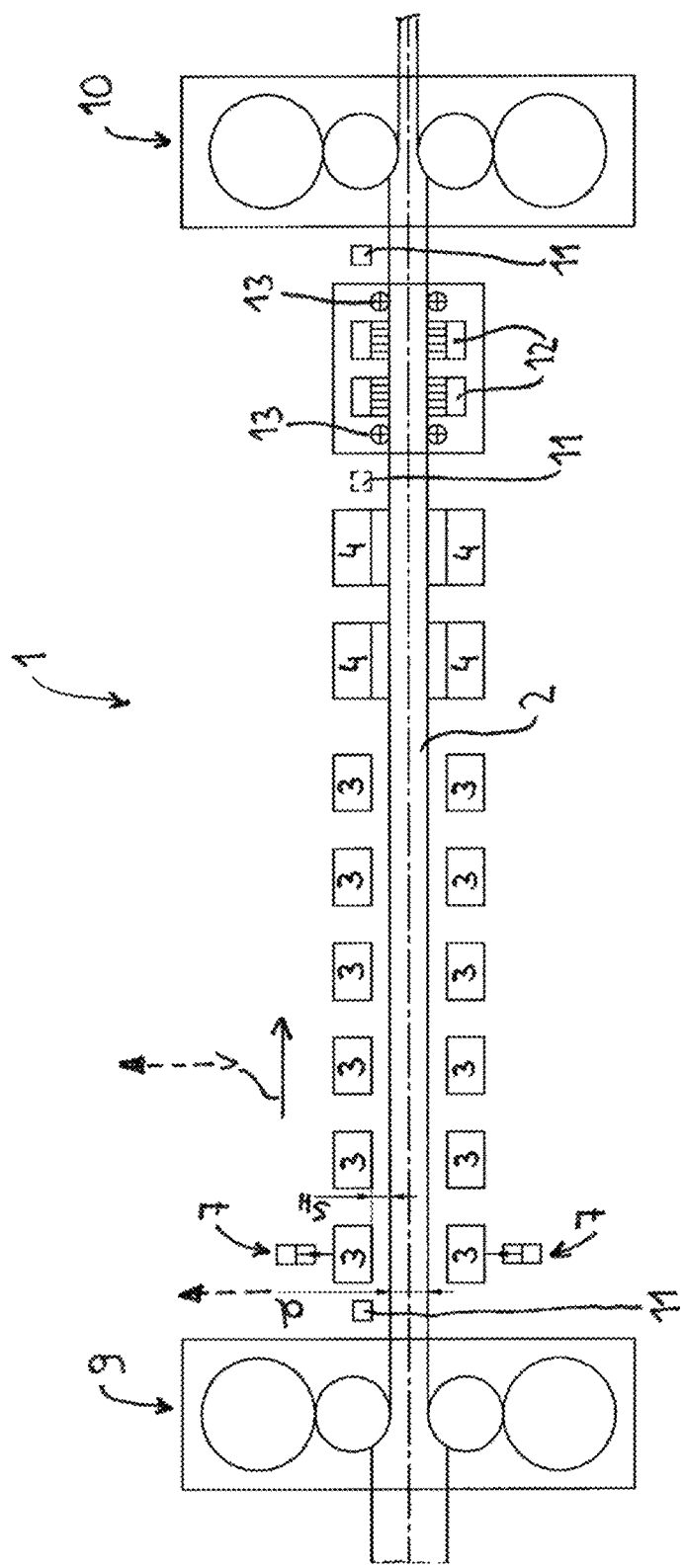
FIG. 7a shows a front view of a third embodiment according to the invention of a heating device.
Figure 7B:
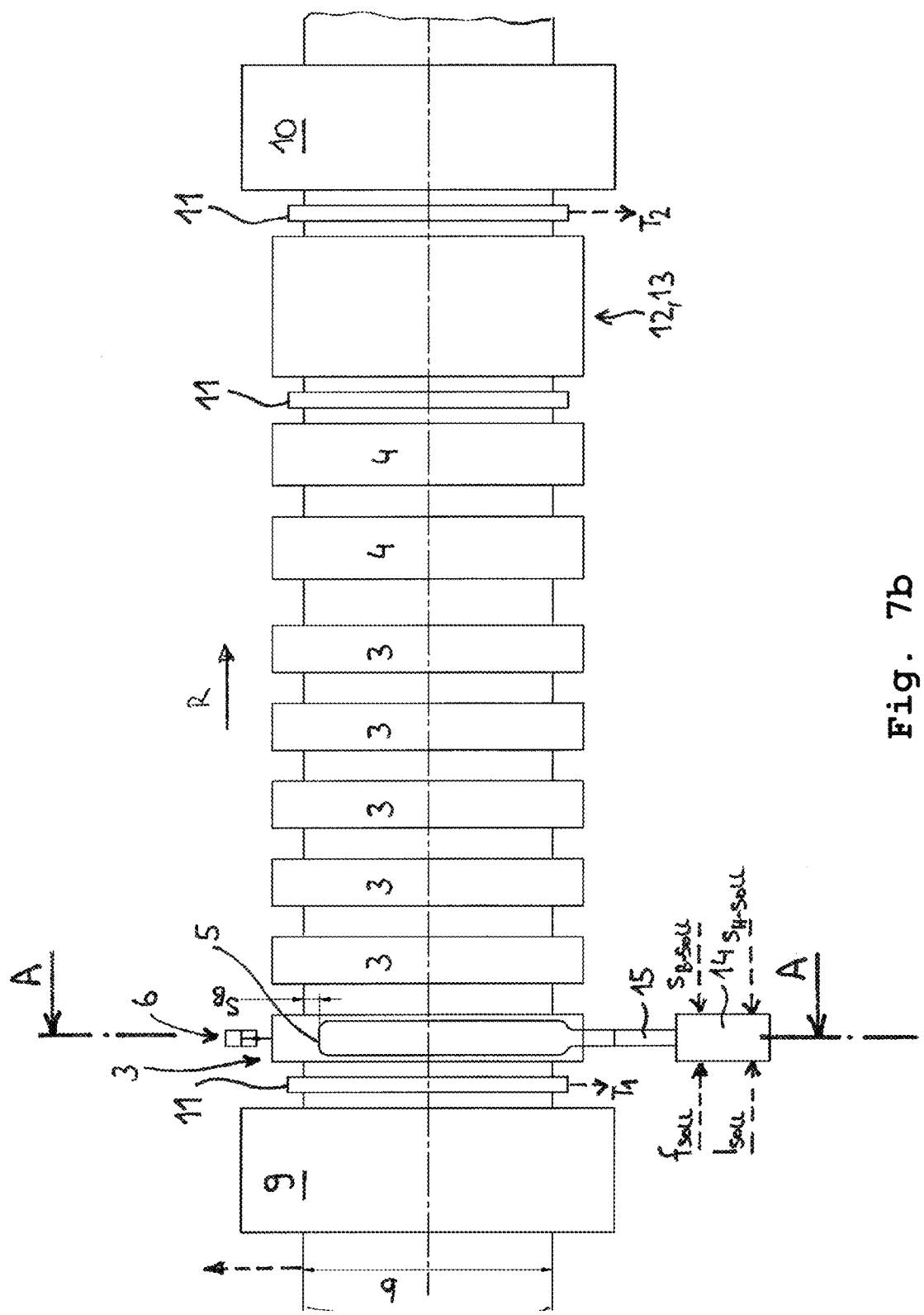
FIG. 7b shows a plan view of the heating device from FIG. 7a, FIG. 7c shows a partially sectional representation along the line A-A from FIG. 7b.
Figure 7C:
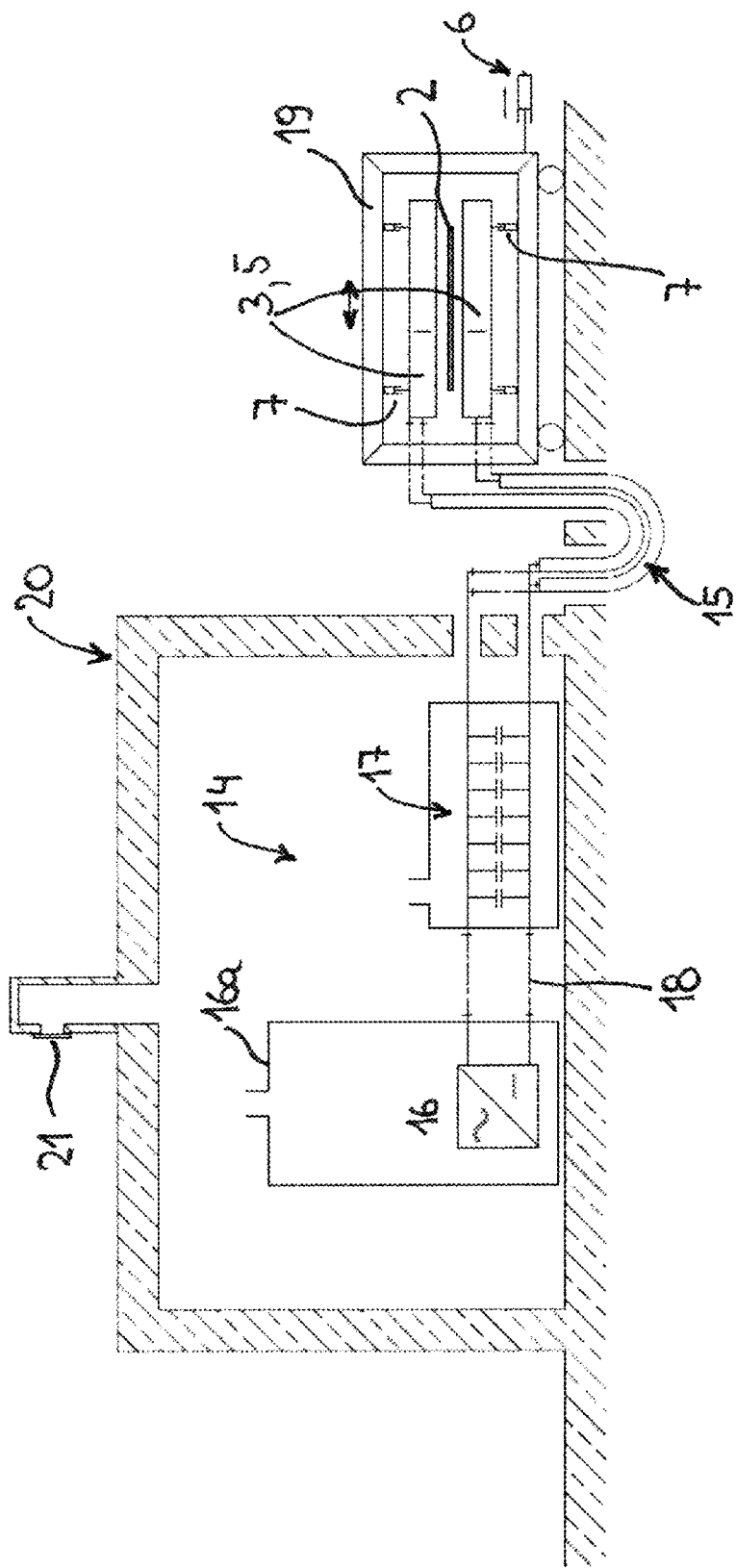

FIGS. 7a and 7b show an elevation and a plan view of a heating device 1 according to the invention in a hot rolling mill. Once the flat steel strip 2 has been rolled in the last stand 9 of a roughing train, the preliminary strip 2 is transported on a roller table, which is not shown any more specifically, to the first stand 10 of the finishing train and is thereby inductively heated by a heating device 1. The heating device 1 comprises six transverse-field modules 3, with a coil 5 above and a coil 5 below the preliminary strip 2 and also two longitudinal-field modules 4, which are arranged behind the transverse-field modules 3. The width b, the thickness d, the speed v and the temperature profile $T_1$ of the preliminary strip 2 are measured by suitable measuring instruments after the last stand 9 of the roughing train and are fed to an open-loop or closed-loop control device 8 (see FIG. 8a). After passing the heating device 1, the preliminary strip 2 is descaled under high pressure, for example 150 to 400 bar, by two descalers 12. Respectively arranged before and after the descalers is a pair of driver rollers 13 to prevent the escape of pressurized water from the descaling region. Either before or preferably after the descalers, the temperature profile $T_2$ of the preliminary strip is measured by a pyrometer 11 and likewise fed to the open-loop or closed-loop control device 8. Before the descalers there may optionally be a pyrometer 11, shown by dashed lines, which measures the temperature profile of the preliminary strip 2 before the descalers. The coils 5 of the transverse-field modules 3 are in each case accommodated in a coil car 19 (also see FIG. 7c). The coil car 19 together with the coils 5 above and below the preliminary strip 2 can be moved by means of a thrust actuator 6 in the direction of the width of the preliminary strip. As a result, the width position 5B, i.e. the distance between a side edge of the preliminary strip 2 and the end of the coil 5, can be set. In addition to this, the height position $s_H$ of the coils 5, and consequently the distance between the upper coil 5 and the upper side and also the lower coil 5 and the underside of the preliminary strip 2, can be changed. The changing of the height is performed by multiple lift actuators 7 (also see FIG. 7c). The power supply 14 of one or more transverse-field modules 3 is accommodated in a climatically controlled and clean electrical compartment 20. FIG. 7c schematically shows a section transversely to the transporting direction R along the line A-A from FIG. 7b with a converter 16 for generating an alternating voltage with a specific frequency f and a specific current intensity I, a capacitor bank 17 with multiple capacitors connected in parallel and flexible cables 15, here coaxial cables, for connecting the capacitor bank 17 to the movable coils 5 on the coil car 19. The connection between the converter 16, arranged in a converter cabinet 16a, and the capacitor bank 17 takes place by way of conductor rails 18. If an accidental arc occurs in the region of the power supply 14, the excess pressure in the electrical compartment 20 is discharged to the outside by way of a shaft with an explosion flap 21. This ensures that no harmful gases or vapors get into the hot rolling mill. As schematically shown in FIG. 7b, the power supply 14 has a frequency input for determining a setpoint frequency $f_{Soll}$, a current input for determining a setpoint current intensity $I_{Soll}$, a width input for determining a setpoint width position $s_{B-Soll}$ and a height input for determining a setpoint height position $s_{H-Soll}$. These inputs can be used to adapt one or more transverse-field modules 3 to the current production conditions with regard to the frequency f and the current intensity I of the alternating voltage and also with regard to the width position $s_B$ and the height position $s_H$. For reasons of overall clarity, in FIG. 7b only a single power supply 14 is shown. It goes without saying that all of the transverse-field modules 3 are connected to power supplies 14, wherein a power supply 14 can supply one or more transverse-field modules 3. The power supply of the longitudinal-field modules 4 has not been shown.

Figure 8A:
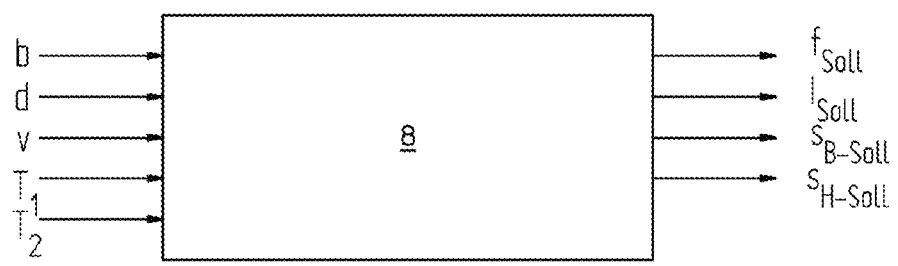
FIG. 8a shows a schematic representation of a first open-loop or closed-loop control device for the heating device of FIG. 7a-FIG. 7c.
Figure 8B:
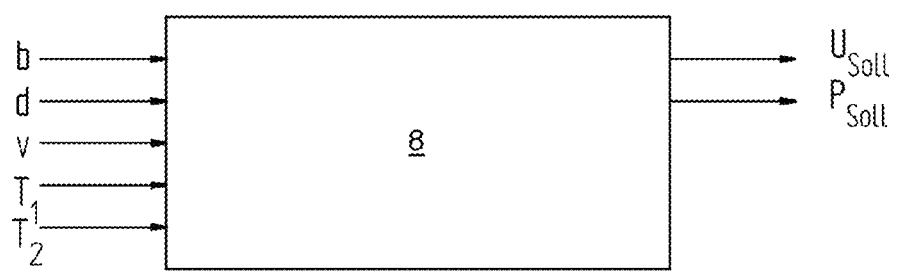
FIG. 8b shows a schematic representation of a second open-loop or closed-loop control device for the heating device of FIG. 7a-FIG. 7c.

FIGS. 8a and 8b each show a diagram of an open-loop or closed-loop control device 8, which is continually fed current data of the production process, such as the width b, the thickness d, the speed v of the preliminary strip and also the temperature profiles $T_1$ of the preliminary strip 2 before entering the heating device 1 and after leaving the heating device 1. According to FIG. 8a, the open-loop or closed-loop control device 8 calculates from these input variables the setpoint frequency $f_{Soll}$ and the setpoint current intensity $I_{Soll}$ for the power supplies 14 and also the setpoint width position $s_{B-Soll}$ and the setpoint height position $s_{H-Soll}$ for the coil cars 19 of the transverse-field modules. According to FIG. 8b, the open-loop or closed-loop control device 8 calculates from these input variables the setpoint voltage $U_{Soll}$ and the setpoint heating power $P_{Soll}$ for the power supplies 14 of the longitudinal-field modules. The setpoint values are connected in terms of signaling by way of the respective outputs of the open-loop or closed-loop control device 8 to the inputs of the power supply or the inputs on the transverse-field modules. The open-loop or closed-loop control device 8 may be for example a PLC or a process computer. It is also possible that the functionality of the open-loop or closed-loop control device 8 is taken over by the plant controller of the rolling plant.

Figure 9:
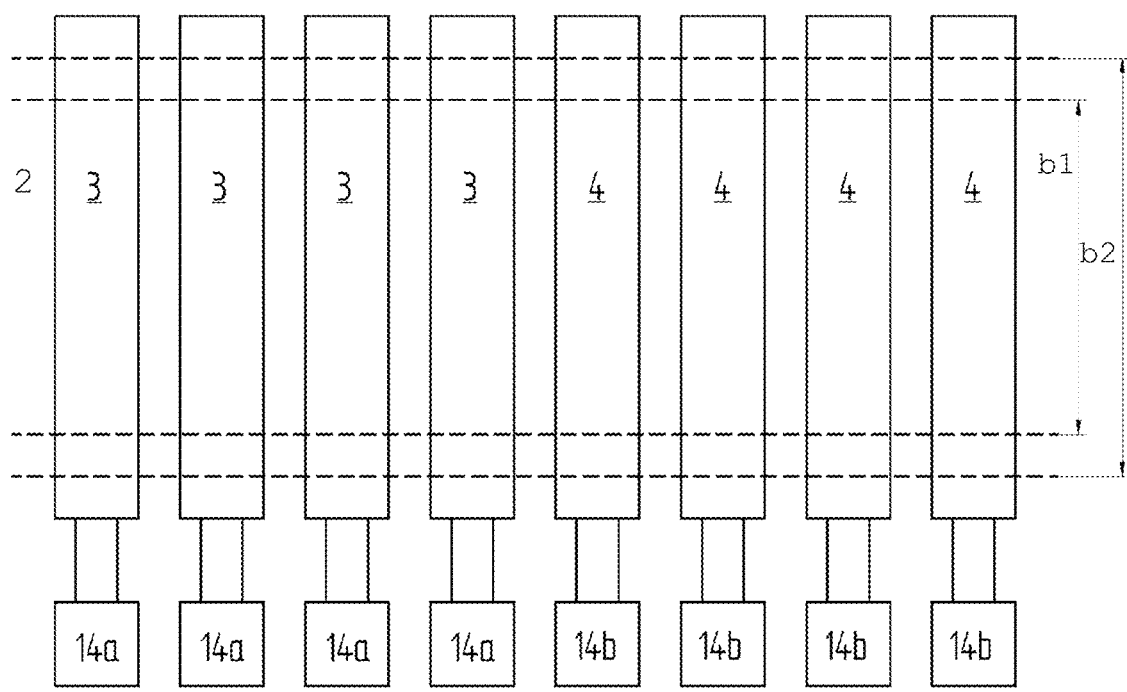
FIG. 9 shows a schematic plan view of a further embodiment according to the invention of a heating device for heating a flat steel strip.

FIG. 9 schematically shows a plan view of a heating device according to the invention with four transverse-field modules 3 and four longitudinal-field modules 4 and also the associated power supplies 14a, 14b.

Figure 10A:
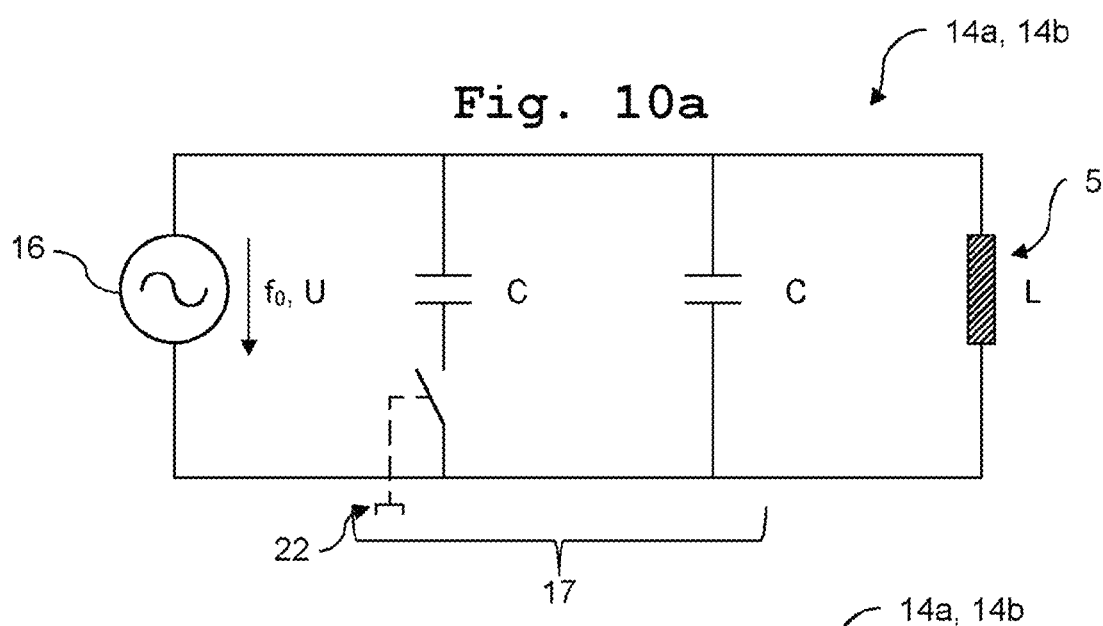
FIGS. 10a, 10b, and 10c show in each case a schematic representation of a power supply for a heating device according to the invention for heating a flat steel strip.

In FIG. 10a, a first variant of a power supply 14a, 14b is schematically shown. The converter 16 is a load-commutated converter, which sets the frequency f of the generated alternating voltage in dependence on the load, specifically the capacitive load of the capacitor bank 17 and the inductive load of the coils 5. The first capacitor, shown on the left, with the capacitance C can be activated or deactivated by means of a switch, which is switched in dependence on a frequency input 22. In the activated state, the frequency f is obtained as $$f = f_0 = \frac{1}{2\pi\sqrt{L2C}};$$

in the deactivated state, the frequency f is obtained as $$f = f_0 = \frac{1}{2\pi\sqrt{LC}}.$$

Furthermore, the voltage amplitude U or the setpoint heating power P can be determined for the converter.

Figure 10B:
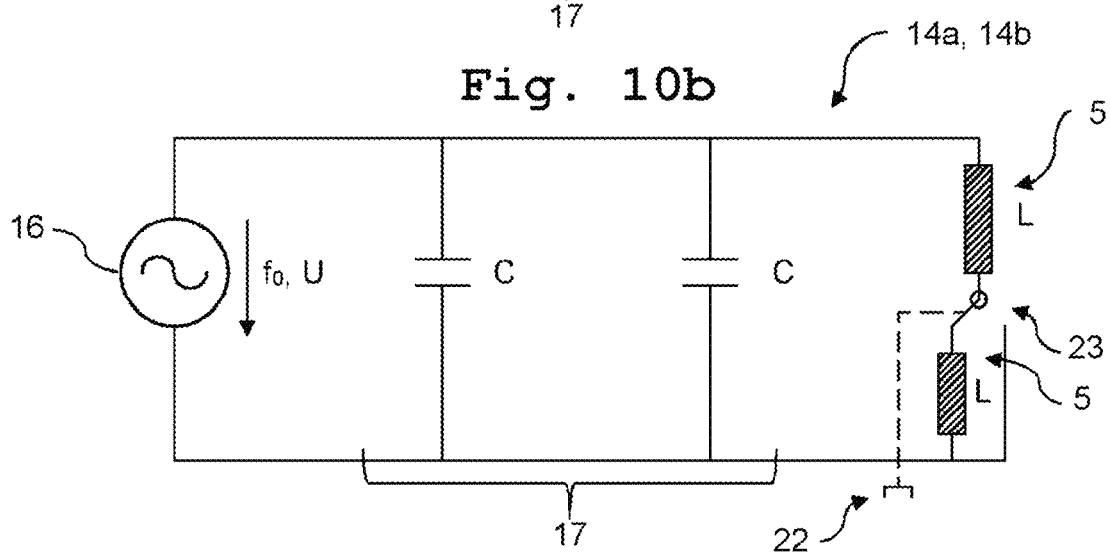

In FIG. 10b, a second variant of a power supply 14a, 14b is schematically shown. The converter 16 is of an identical configuration to the converter from FIG. 10a. The capacitors of the capacitor bank 17 may however not be switched. However, current may be fed to either one or two coils 5. In one case, the frequency f is obtained as $$f = f_0 = \frac{1}{2\pi\sqrt{2L2C}};$$

in the deactivated state, the frequency f is obtained as $$f = f_0 = \frac{1}{2\pi\sqrt{L2C}}.$$

Again, the voltage amplitude U or the setpoint heating power P can be determined for the converter.

Of course both inductances and capacitances in a circuit may be activated or deactivated.

Figure 10C:
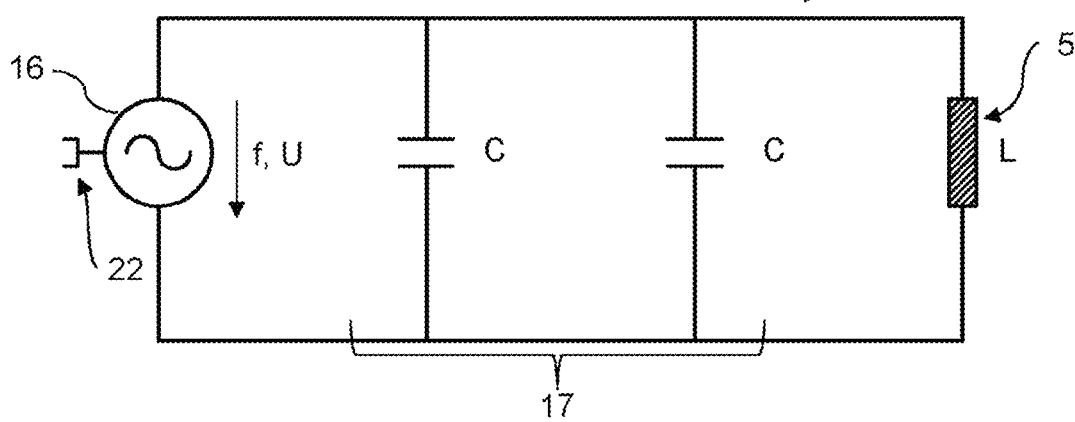

FIG. 10c finally shows a third variant of a power supply 14a, 14b with a non-load-commutated or externally commutated converter 16. The load is 2C for the capacitor bank 17 and L for the coil 5. In the case of a load-commutated converter, the frequency f of the alternating voltage would be obtained as $$f = f_0 = \frac{1}{2\pi\sqrt{L2C}}.$$

In contrast to this, the actual frequency f of the alternating voltage may deviate from $f_0$, because f is determined directly for the converter 16 by a frequency input 22. In the case of the operation of an externally commutated converter, it must be noted that the power supply must feed not only the heating power but also the reactive power to the converter.

In the description of FIGS. 10a . . . c, $f_0$ denotes the resonant frequency of a so-called LC resonant circuit.

The circuits indicated in FIGS. 10a . . . 10c are schematic and do not take into account the magnetic coupling between the coil or the coils 5 and the flat steel strip 2.

LIST OF DESIGNATIONS

| | |
|---|---|
| 1 | Heating device |
| 2 | Flat steel strip, preliminary strip |
| 3 | Transverse-field module |
| 4 | Longitudinal-field module |
| 5 | Coil |
| 6 | Thrust actuator |
| 7 | Lift actuator |
| 8 | Open-loop or closed-loop control device |
| 9 | Stand of the roughing train |
| 10 | Stand of the finishing train |
| 11 | Thermometer or pyrometer |
| 12 | Descalers |
| 13 | Driving roller |
| 14, 14a, 14b | Power supply |
| 15 | Flexible cable |
| 16 | Converter |
| 16a | Converter cabinet |
| 17 | Capacitor bank |
| 18 | Conductor rail |
| 19 | Coil car |
| 20 | Electrical compartment |
| 21 | Explosion flap |
| 22 | Frequency input |
| 23 | Switch |
| b, b1, b2 | Width of the flat steel strip |
| C | Capacitance |
| d | Thickness of the flat steel strip |
| f, f1, f2, f3, f4 | Frequency, actual frequency |
| $f_0$ | Resonant frequency of an LC resonant circuit |
| $f_{Soll}$ | Setpoint frequency |
| M | Magnetic flux |
| I | Current, current intensity, actual current intensity |
| $I_{Soll}$ | Setpoint current |
| L | Inductance |
| P | Power |
| R | Transporting direction |
| $S_B$ | Width position of the coil, actual width pos. |
| $S_{B\text{-}Soll}$ | Setpoint width position of the coil |
| $S_H$ | Height position of the coil, actual height pos. |
| $S_{H\text{-}Soll}$ | Setpoint height position of the coil |
| $T_1, T_2$ | Temperature or temperature profile |
| U | Voltage |
| v | Speed of the flat steel strip |
| W | Eddy current |

The invention claimed is:

1. A method for the inductive heating of a flat steel strip in a hot rolling mill by a heating device, wherein the heating device is arranged between two rolling trains of the hot rolling mill and the flat steel strip runs at a speed through the heating device in a transporting direction, comprising the method steps of:

heating the flat steel strip by a first module group with a plurality of transverse-field modules, which are arranged one after the other along the transporting direction; and heating the flat steel strip by a second module group with a plurality of longitudinal-field modules, the second module group being arranged one after the other along the transporting direction and being arranged before or after the first module group along the transporting direction, and adjusting with a lift actuator a height position of at least one coil of at least one of the transverse-field modules;

wherein a power supply for supplying at least one transverse-field module or at least one longitudinal-field module has a converter, which is operated as a load-commutated converter; and wherein the frequency f of the generated alternating voltage is $$f = \frac{1}{2\pi\sqrt{L_{Ges}C_{Ges}}},$$

where $L_{Ges}$ indicates the total inductive load and $C_{Ges}$ indicates the total capacitive load in the circuit.

2. The method as claimed in claim 1, wherein the heating device is arranged between two rolling trains of the hot rolling mill and the flat steel strip runs at a speed through the heating device in a transporting direction, comprising the method steps of:

heating the flat steel strip by a plurality of transverse-field modules, which are arranged one after the other along the transporting direction; and heating the flat steel strip by a plurality of longitudinal-field modules, which are arranged one after the other along the transporting direction and are arranged before or after the transverse-field modules along the transporting direction;

wherein a power supply for supplying at least one transverse-field module or at least one longitudinal-field module has a converter, which is operated as an externally commutated converter; and wherein the frequency f of the generated alternating voltage is $$f \neq \frac{1}{2\pi\sqrt{L_{Ges}C_{Ges}}},$$

where $L_{Ges}$ indicates the total inductive load and $C_{Ges}$ indicates the total capacitive load in the circuit.

3. The method as claimed in claim 1, wherein a transverse-field module is operated with an alternating voltage with a frequency and the frequency is changed during a rolling campaign or between two rolling campaigns.

4. The method as claimed in claim 3, wherein the frequency is set in dependence on the thickness of the flat steel strip.

5. The method as claimed in claim 1, wherein a transverse-field module is operated with a current intensity and the current intensity is set in dependence on at least one parameter of the flat steel strip from the group comprising the thickness, the speed, the temperature before entering the heating device, and the temperature after leaving the heating device.

6. A heating device for the inductive heating of a flat steel strip in a hot rolling mill, the heating device being arranged between two rolling trains of the hot rolling mill and the flat steel strip runs at a speed through the heating device in a transporting direction, the heating device comprising:

a first module group with a plurality of transverse-field modules arranged one after the other along the transporting direction of the flat steel strip;

a second module group with a plurality of longitudinal-field modules arranged one after the other along the transporting direction of the flat steel strip, the second module group being arranged before or after the first module group along the transporting direction;

a first power supply adapted to supply at least one transverse-field module with a first alternating voltage;

a second power supply adapted to supply at least one longitudinal-field module with a second alternating voltage; and a lift actuator for changing the height position of at least one coil of a transverse-field module;

wherein the power supplies have in each case a converter and an electrically connected capacitor bank with multiple capacitors connected in parallel.

7. The heating device as claimed in claim 6, wherein at least one of the first and the second power supply comprises a frequency input for determining a setpoint frequency and the frequency of the generated alternating voltage follows the setpoint frequency.

8. The heating device as claimed in claim 6, wherein at least one of the first and the second power supply comprises a current input for determining a setpoint current intensity and the current intensity follows the generated alternating voltage of the setpoint current intensity.

9. The heating device as claimed in claim 6, wherein at least one of the first and the second power supply comprises a voltage input for determining a setpoint voltage and the voltage amplitude (U) of the generated alternating voltage follows the setpoint voltage.

10. The heating device as claimed in claim 6, wherein at least one of the first and the second power supply comprises a power input for determining a setpoint power and the heating power of the generated alternating voltage follows the setpoint power.

11. The heating device as claimed in claim 6, further comprising a thrust actuator for changing the width position of at least one coil of a transverse-field module.

12. The heating device as claimed in claim 11, wherein the transverse-field module comprises a width input for determining a setpoint width position and the width position of a coil of the transverse-field module in the direction of the width follows the setpoint width position.

13. The heating device as claimed in claim 6, wherein a transverse-field module comprises a height input for determining a setpoint height position and the height position of a coil of a transverse-field module in the direction of the thickness follows the setpoint height position.

14. The heating device as claimed in claim 6, further comprising an open-loop or closed-loop control device, wherein the open-loop or closed-loop control device comprises at least one output from the group comprising:

a frequency output for determining a setpoint frequency of the first alternating voltage;

a current output for determining a setpoint current intensity of the first alternating voltage;

a voltage output for determining a setpoint voltage of the first alternating voltage;

a power output for determining a setpoint power of the first alternating voltage;

and the open-loop or closed-loop control device additionally comprises at least one of:

a width output for determining a setpoint width position in the direction of the width of a coil of a transverse-field module; and a height output for determining a setpoint height position (sH-Soll) in the direction of the thickness of a coil of a transverse-field module, wherein at least one output from the group comprising the setpoint current intensity, the setpoint frequency, the setpoint voltage, and the setpoint power, and additionally at least one of the setpoint width position and the setpoint height position, are set in dependence on at least one parameter of the flat steel strip from the group comprising the thickness, the width, the speed, the temperature before entering the heating device, and the temperature after leaving the heating device.

15. The heating device as claimed in claim 6, further comprising an open-loop or closed-loop control device, wherein the open-loop or closed-loop control device comprises at least one output from the group comprising:
- a frequency output adapted to determine a setpoint frequency of the second alternating voltage;
- a current output adapted to determine a setpoint current intensity of the second alternating voltage;
- a voltage output adapted to determine a setpoint voltage of the second alternating voltage; and
- a power output adapted to determine a setpoint power of the second alternating voltage;

wherein at least one output from the group comprising the setpoint current intensity, the setpoint frequency, the setpoint voltage, and the setpoint power, is set in dependence on at least one parameter of the flat steel strip from the group comprising the thickness, the width, the speed, the temperature before entering the heating device, and the temperature after leaving the heating device.

16. The heating device as claimed in claim 6, wherein the first module group comprises 6 to 12 transverse-field modules.

17. The heating device as claimed in claim 6, wherein the second module group comprises 2 to 8 longitudinal-field modules.

* * * * *